(12) United States Patent
Taniguchi et al.

(10) Patent No.: US 8,653,714 B2
(45) Date of Patent: Feb. 18, 2014

(54) STATOR FOR ELECTRIC ROTATING MACHINE

(75) Inventors: Makoto Taniguchi, Obu (JP); Satoshi Ito, Obu (JP)

(73) Assignee: Denso Corporation, Kariya (JP)

( * ) Notice: Subject to any disclaimer, the term of this patent is extended or adjusted under 35 U.S.C. 154(b) by 206 days.

(21) Appl. No.: 13/175,010

(22) Filed: Jul. 1, 2011

(65) Prior Publication Data
US 2012/0007463 A1 Jan. 12, 2012

(30) Foreign Application Priority Data
Jul. 6, 2010 (JP) .................................. 2010-154165

(51) Int. Cl.
*H02K 1/18* (2006.01)

(52) U.S. Cl.
USPC ....... 310/216.079; 310/216.088; 310/216.099

(58) Field of Classification Search
USPC ............ 310/159, 216.071–216.076, 216.086, 310/258, 216.079, 216.081, 216.082, 310/216.088, 216.089, 216.98, 216.099, 310/216.103, 216.106
See application file for complete search history.

(56) References Cited

U.S. PATENT DOCUMENTS

| 6,211,595 | B1 * | 4/2001 | Nose ...................... 310/216.111 |
| 6,225,725 | B1 * | 5/2001 | Itoh et al. ............... 310/216.004 |
| 6,348,753 | B1 * | 2/2002 | Sakai et al. ............ 310/216.001 |
| 6,822,364 | B2 * | 11/2004 | Suzuki et al. .......... 310/216.012 |
| 6,936,948 | B2 * | 8/2005 | Bell et al. ....................... 310/201 |
| 7,439,713 | B2 * | 10/2008 | Dooley ............................ 322/22 |
| 2008/0061653 | A1 * | 3/2008 | Sagara et al. ................. 310/254 |

FOREIGN PATENT DOCUMENTS

JP 7-111746 4/1995

\* cited by examiner

*Primary Examiner* — Dang Le
(74) *Attorney, Agent, or Firm* — Nixon & Vanderhye P.C.

(57) ABSTRACT

A stator for an electric rotating machine includes a stator core that has an annular yoke portion, a plurality of tooth portions, a plurality of connecting portions and a plurality of slots. The tooth portions are separately formed from and assembled to the yoke portion. Each of the tooth portions extends radially inward from a radially inner periphery of the yoke portion. The tooth portions are arranged in the circumferential direction of the yoke portion at predetermined intervals. Each of the connecting portions circumferentially extends to connect a corresponding circumferentially-adjacent pair of the tooth portions. Each of the slots is formed between a circumferentially-adjacent pair of the tooth portions. Moreover, each of the slots is partitioned by a corresponding one of the connecting portions into a radially-outer section and a radially-inner section.

8 Claims, 10 Drawing Sheets

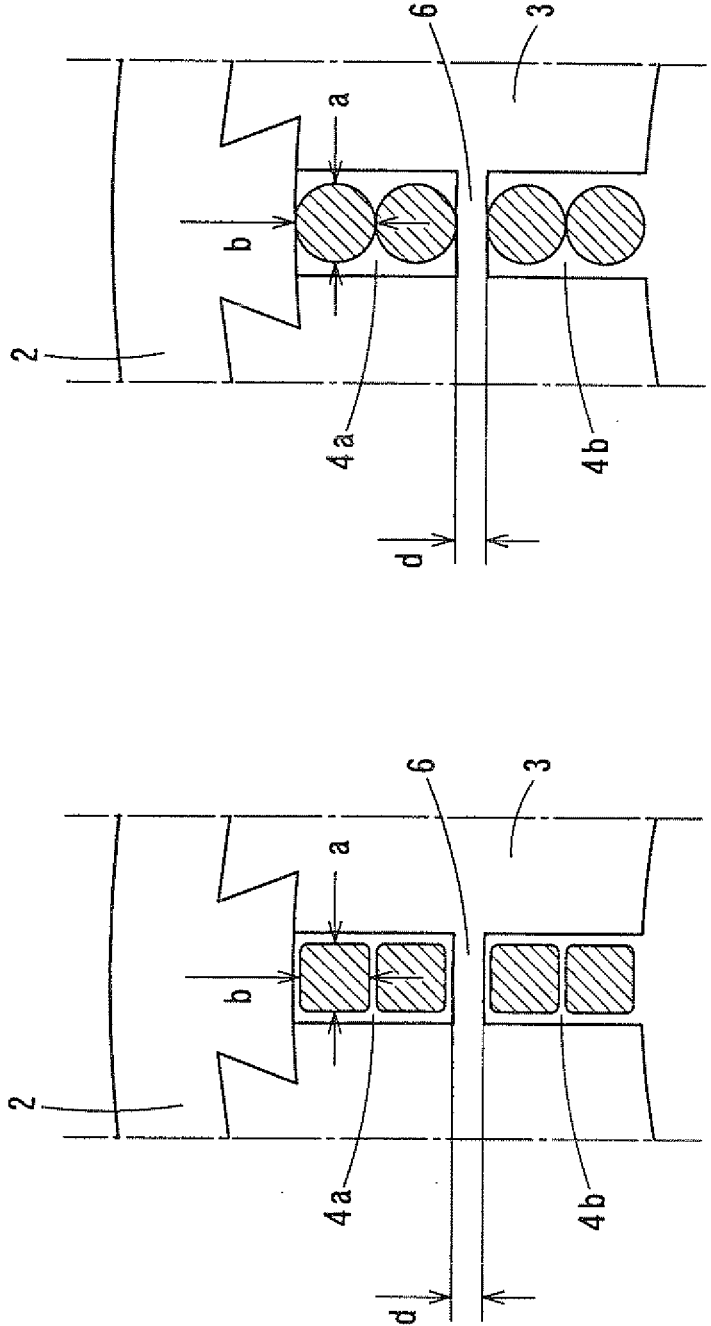

STATOR FOR ELECTRIC ROTATING MACHINE

CROSS-REFERENCE TO RELATED APPLICATION

This application is based on and claims priority from Japanese Patent Application No. 2010-154165, filed on Jul. 6, 2010, the content of which is hereby incorporated by reference in its entirety into this application.

BACKGROUND

1 Technical Field

The present invention relates to stators for electric rotating machines which include a stator core having a yoke portion and a plurality of tooth portions that are separately formed from and assembled to the yoke portion.

2 Description of Related Art

In recent years, AC (Alternating Current) motors, such as induction motors and synchronous motors, have been required to be small in size and high in output.

To meet such a requirement, there is disclosed, for example in Japanese Patent Application Publication No. H07-111746, a method of manufacturing a stator for an AC motor.

Specifically, referring to FIG. 11, according to the method, a stator core 100 is configured to include an annular yoke portion 110 and a plurality of tooth portions 120 that are separately formed from the yoke portion 110. The yoke portion 110 has a plurality of recesses 111 formed in a radially inner surface thereof. On the other hand, each of the tooth portions 120 has a protrusion 121 formed at a radially outer end thereof. In manufacturing the stator, a stator coil (not shown) is first wound around the tooth portions 120 at high density. Then, the tooth portions 120 are assembled to the yoke portion 110 by fitting the protrusions 121 of the tooth portions 120 respectively into the recesses 111 of the yoke portion 110 in the axial direction of the yoke portion 110. Consequently, the stator is obtained which includes the stator core 100 and the stator coil mounted on the stator core 100.

Moreover, according to the method, for facilitating the process of assembling the tooth portions 120 to the yoke portion 110, the stator core 100 is configured to further include an annular connecting portion 130 that circumferentially extends to connect together all the radially inner ends of the tooth portions 120.

However, with the above configuration of the stator core 100, during operation of the motor, part of magnetic flux may flow through the connecting portion 130 in the circumferential direction of the stator core 100; the magnetic flux is created, by current flowing through the stator coil, on the radially outer periphery of a rotor (not shown) of the motor which is disposed radially inside the stator. Consequently, the connecting portion 130 may be magnetically saturated, thus undesirably affecting the distribution of magnetic flux in the motor and thereby resulting in torque ripple of the motor. As a result, when the motor is employed in an electric steering system of a motor vehicle so that the torque generated by the motor is directly transmitted to the steering wheel of the vehicle, the torque ripple will deteriorate the steering feeling of the driver.

SUMMARY

According to the present invention, there is provided a stator for an electric rotating machine. The stator includes a stator core and a stator coil. The stator core has an annular yoke portion, a plurality of tooth portions and a plurality of slots. Each of the tooth portions extends radially inward from a radially inner periphery of the yoke portion. The tooth portions are arranged in the circumferential direction of the yoke portion at predetermined intervals. Each of the slots is formed between a circumferentially-adjacent pair of the tooth portions. The stator coil is mounted on the stator core so as to have a plurality of in-slot portions each of which is received in a corresponding one of the slots of the stator core. Furthermore, in the stator, the tooth portions of the stator core are separately formed from and assembled to the yoke portion. The stator core further has a plurality of connecting portions each of which circumferentially extends to connect a corresponding circumferentially-adjacent pair of the tooth portions. Each of the slots of the stator core is partitioned by a corresponding one of the connecting portions into a radially-outer section and a radially-inner section.

With the above configuration, for each of the slots of the stator core, when the stator coil is energized so that the direction of current flowing through the in-slot portions received in the radially-outer section is the same as that of current flowing through the in-slot portions received in the radially-inner section, the directions of magnetic fields respectively created by the two currents will be opposite to each other at the corresponding connecting portion. Consequently, it is possible to reduce the resultant magnetic flux flowing through the corresponding connecting portion, thereby preventing the corresponding connecting portion from being magnetically saturated. As a result, it is possible to prevent the distribution of magnetic flux in the motor from being undesirably affected by magnetic saturation of the connecting portions of the stator core, thereby suppressing torque ripple of the motor.

Preferably, each of the slots is equally partitioned by the corresponding connecting portion so that the area of a cross section of the radially-outer section perpendicular to the axial direction of the yoke portion is equal to that of the radially-inner section perpendicular to the axial direction.

In one embodiment, the yoke portion has a plurality of recesses that are formed in a radially inner surface of the yoke portion and spaced at predetermined intervals in the circumferential direction of the yoke portion. Each of the tooth portions has a protrusion formed at a radially outer end thereof. The tooth portions are assembled to the yoke portion by fitting the protrusions of the tooth portions respectively into the recesses of the yoke portion.

In another embodiment, the tooth portions are assembled to the yoke portion by press-fitting radially outer surfaces of the tooth portions to a radially inner surface of the yoke portion.

The tooth portions may be shaped so that each of the slots formed between the tooth portions has a constant circumferential width in a radial direction of the yoke portion.

Otherwise, the tooth portions may be so shaped as to have a constant circumferential width in a radial direction of the yoke portion.

Preferably, in the stator, the following dimensional relationship is satisfied: a≥b>d, where a is the maximum width of each of the in-slot portions of the stator coil in a width-wise direction of the corresponding slot, b is the maximum thickness of each of the in-slot portions of the stator coil in a radial direction of the stator core, and d is the radial thickness of the connecting portions of the stator core.

All of the tooth portions and connecting portions of the stator core together make up a stator tooth ring. The stator tooth ring may be formed by laminating a plurality of magnetic steel sheets in the axial direction of the yoke portion. In this case, the radial thickness of the connecting portions is preferably set to be greater than the thickness of the magnetic steel sheets.

Preferably, the stator coil is mounted on the stator core so that: in each of the radially-outer and radially-inner sections of the slots, there is received at least one of the in-slot portions of the stator coil; for each of the slots, the at least one in-slot portion received in the radially-outer section of the slot creates a first magnetic field while the at least one in-slot portion received in the radially-inner section of the slot creates a second magnetic field; the magnitudes of the first and second magnetic fields are equal to each other, but the directions of the first and second magnetic fields are opposite to each other at the corresponding connecting portion by which the slot is partitioned.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIGS. 3A-3B and 4A-4B are schematic views illustrating examples of the cross-sectional shape of in-slot portions of a stator coil of the stator;

DESCRIPTION OF PREFERRED EMBODIMENTS

Figure 1:
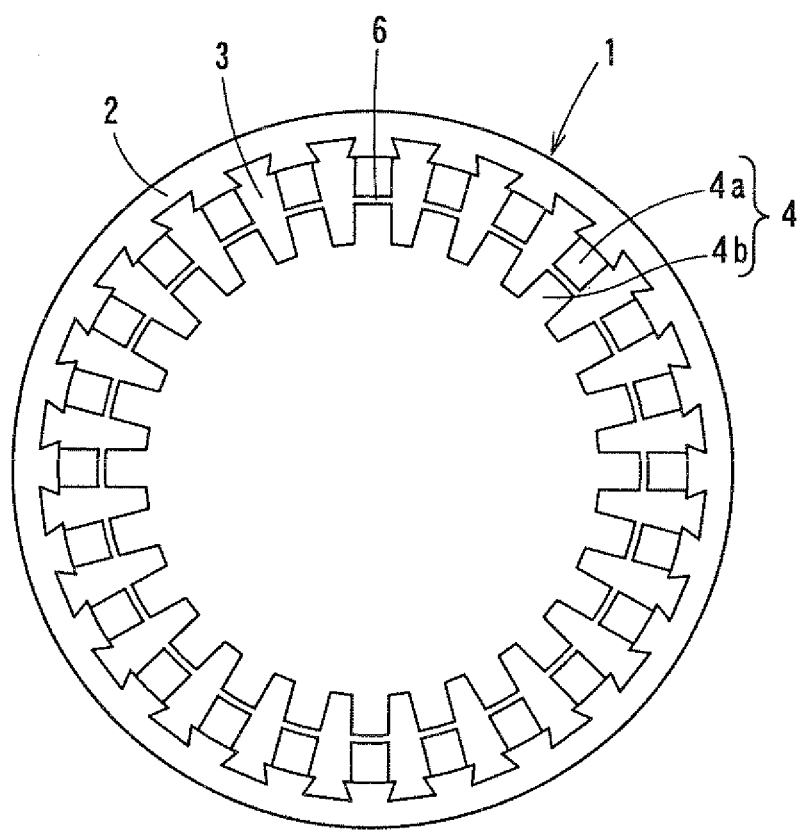
FIG. 1 is an axial end view of a stator core of a stator for a motor according to the first embodiment of the invention.

Preferred embodiments of the present invention will be described hereinafter with reference to FIGS. 1-10. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated.

First Embodiment

FIG. 1 shows the overall configuration of a stator core 1 of a stator according to the first embodiment of the invention. The stator is for use in an AC motor, such as an induction motor or a synchronous motor. More particularly, in the present embodiment, the stator is configured to be used in an 8-pole, 24-slot, 3-phase, full-pitch and distributed winding motor.

As shown in FIG. 1, the stator core 1 includes an annular yoke portion 2, a plurality of tooth portions 3 and a plurality of slots 4. Each of the tooth portions 3 extends radially inward from a radially inner periphery of the yoke portion 2. The tooth portions 3 are arranged at predetermined intervals in the circumferential direction of the annular yoke portion 2. Each of the slots 4 is formed between a circumferentially-adjacent pair of the tooth portions 3. In addition, in the present embodiment, both the number of the tooth portions 3 and the number of the slots 4 are set to be equal to 24.

The stator further includes a stator coil that is formed by Y-connecting or Δ-connecting three phase-windings that are wound around the stator core 1 and different in phase by 120° from each other. The stator coil is supplied with three-phase AC power via an external inverter (not shown), thereby creating a rotating magnetic field.

In addition, in the motor, the stator core 1 is disposed coaxially with a rotor (not shown) of the motor so as to surround the rotor. The rotor is rotatably supported by a housing (not shown) of the motor via bearings (not shown). The rotor may be a cage-type rotor if the motor is an induction motor, a permanent magnet-type rotor if the motor is a synchronous motor, or a salient pole-type rotor if the motor is a reluctance motor.

Figure 2B:
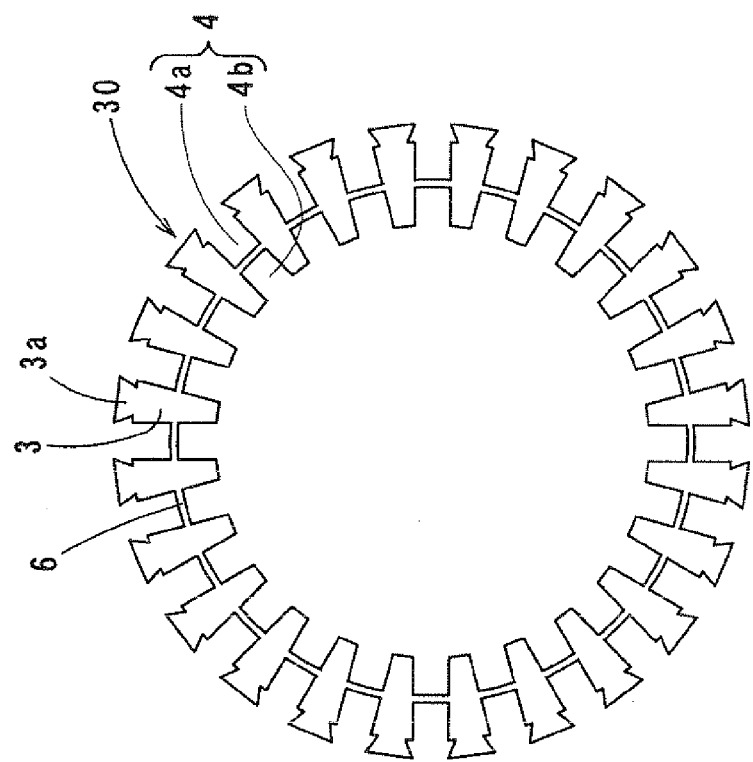
FIG. 2B is an axial end view of a stator tooth ring of the stator core.
Figure 2A:
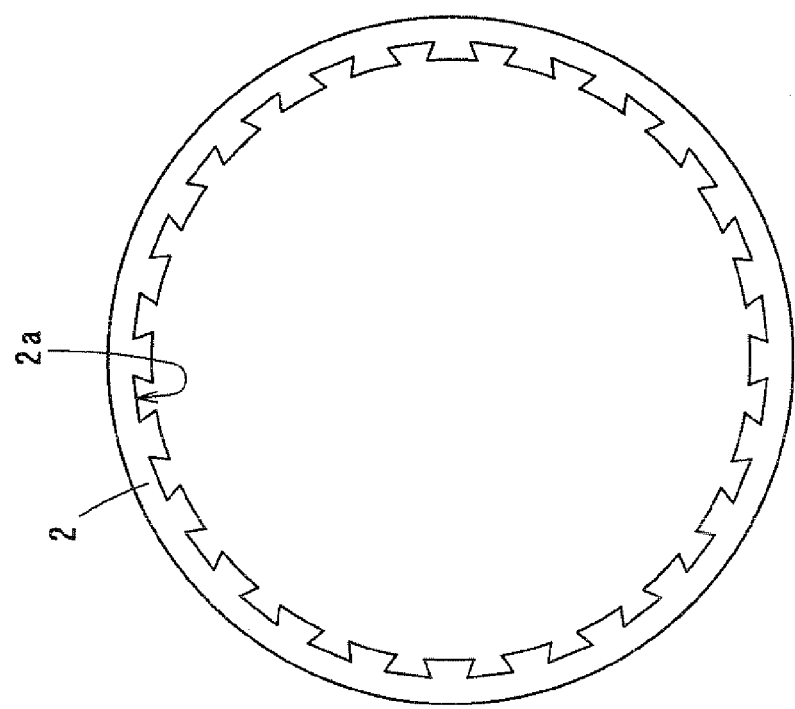
FIG. 2A is an axial end view of a yoke portion of the stator core.

Referring now to FIGS. 2A-2B, in the present embodiment, the annular yoke portion 2 is separately formed from the tooth portions 3.

The yoke portion 2 has a plurality of recesses 2a that are formed in the radially inner surface of the yoke portion 2 and spaced at predetermined intervals in the circumferential direction of the yoke portion 2. Each of the recesses 2a extends in the axial direction of the yoke portion 2 over the entire axial length of the yoke portion 2. Moreover, for each of the recesses 2a, the circumferential width of the recess 2a is gradually increased in the radially outward direction. Consequently, when viewed along the axial direction of the yoke portion 2, each of the recesses 2a has a trapezoidal shape tapering radially inward.

In addition, in the present embodiment, the yoke portion 2 is comprised of a plurality of magnetic steel sheets that are shaped, for example by pressing, to have the annular shape as shown in FIG. 2A and laminated in the axial direction of the yoke portion 2.

The tooth portions 3 are so shaped that the circumferential width of each of the slots 4 formed between the tooth portions 3 is constant in the radial direction. In other words, for each of the slots 4, those circumferential side surfaces of the tooth portions 3 which define the slot 4 therebetween extend parallel to each other. Accordingly, the circumferential width of each of the tooth portions 3 is gradually decreased in the radially inward direction. As a result, when viewed along the axial direction of the stator core 1 (or the axial direction of the yoke portion 2), each of the tooth portions 3 has an overall shape tapering radially inward.

Moreover, each of the tooth portions 3 has a protrusion 3*a* formed at a radially outer end thereof. The protrusions 3*a* of the tooth portions 3 are so shaped that each of the protrusions 3*a* can be fitted into a corresponding one of the recesses 2*a* of the yoke portion 2 with almost no clearance therebetween. That is, when viewed along the axial direction of the stator core 1, each of the protrusions 3*a* of the tooth portions 3 also has a trapezoidal shape tapering radially inward.

In the present embodiment, the stator core 1 further includes a plurality of connecting portions 6 each of which circumferentially extends (or extends in the circumferential direction of the yoke portion 2) to connect a corresponding circumferentially-adjacent pair of the tooth portions 3. As a result, all the tooth portions 3 are connected together by the connecting portions 6, forming a stator tooth ring 30 as shown in FIG. 2B.

In addition, in the present embodiment, the stator tooth ring 30 is also comprised of a plurality of magnetic steel sheets that are shaped, for example by pressing, to have the annular shape as shown in FIG. 2B and laminated in the axial direction of the stator core 1.

Moreover, in the present embodiment, each of the connecting portions 6 is radially positioned so as to equally partition a corresponding one of the slots 4 into a radially-outer section 4*a* and a radially-inner section 4*b*. That is, the area of a cross section of the radially-outer section 4*a* perpendicular to the axial direction of the stator core 1 is equal to that of the radially-inner section 4*b* in the axial direction. In addition, though not graphically shown, each of the connecting portions 6 extends in the axial direction of the stator core 1 over the entire axial length of the stator core 1.

In manufacturing the stator, the phase windings are first wound around the tooth portions 5 of the stator tooth ring 30 so as to be partially received in the slots 4. Then, the phase windings are Y-connected or Δ-connected to form the stator coil. Thereafter, the stator tooth ring 30 is assembled to the yoke portion 2 by fitting the protrusions 3*a* of the tooth portions 3 respectively into the recesses 2*a* of the yoke portion 2 in the axial direction of the stator core 1. Consequently, the stator is obtained which includes the stator core 1 and the stator coil mounted on the stator core 1.

Further, as shown in FIGS. 3A-4B, the stator coil includes a plurality of in-slot portions 5 received in the slots 4 of the stator core 1. Moreover, in each of the slots 4, there are received a predetermined number of (e.g., 4 in the present embodiment) in-slot portions 5 of the stator coil in alignment with each other in the radial direction of the stator core 1. Furthermore, for each of the slots 4, the number of the in-slot portions 5 of the stator coil received in the radially-outer section 4*a* of the slot 4 is equal to that of the in-slot portions 5 of the stator coil received in the radially-inner section 4*b* of the slot 4. That is, the total cross-sectional area of the in-slot portions 5 received in the radially-outer section 4*a* is equal to that of the in-slot portions 5 received in the radially-inner section 4*b*.

Figure 5:
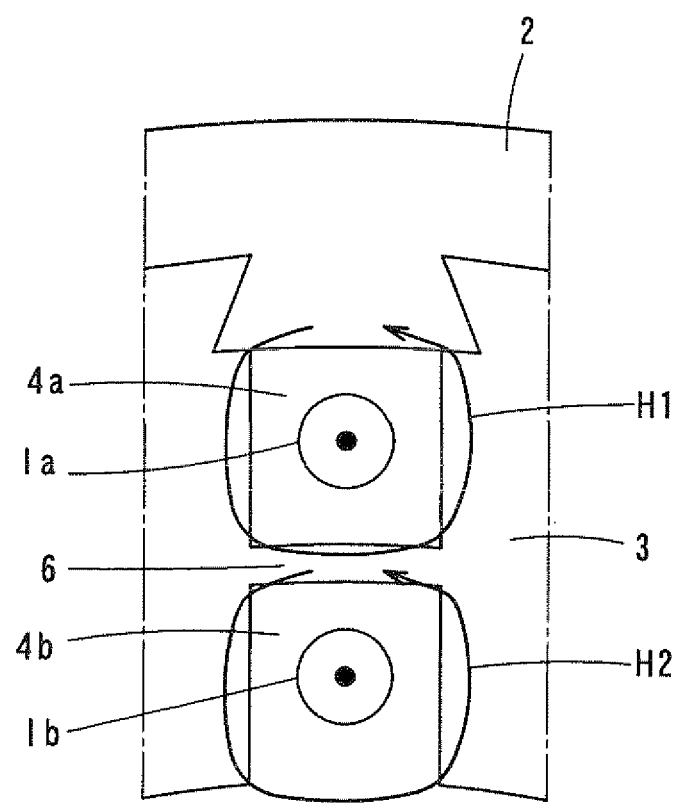
FIG. 5 is a schematic view illustrating the directions of current flowing through the in-slot portions of the stator coil received in a radially-outer section of a slot of the stator core and current flowing through the in-slot portions received in a radially-inner section of the slot as well as the directions of magnetic fields respectively created by the currents.

FIG. 5 shows the directions of current Ia flowing through the in-slot portions 5 received in the radially-outer section 4*a* and current Ib flowing through the in-slot portions 5 received in the radially-inner section 4*b* as well as the directions of magnetic fields H1 and H2 respectively created by the currents Ia and Ib. It should be noted that for the sake of clarity and simplicity, the in-slot portions 5 of the stator coil are not depicted in FIG. 5.

As shown in FIG. 5, in the present embodiment, both the currents Ia and Ib flow in the same direction, i.e., in the direction from the rear side to the front side of the paper surface of FIG. 5. Moreover, the cross-sectional area of each of the in-slot portions 5 received in the radially-outer section 4*a* is equal to that of the in-slot portions 5 received in the radially-inner section 4*b*. Accordingly, the magnitude of the current Ia is also equal to that of the current Ib. Consequently, the magnitude (or strength) of the magnetic field H1 created by the current Ia is equal to that of the magnetic field H2 created by the current Ib. However, the directions of the magnetic fields H1 and H2 are opposite to each other at the connecting portion 6 by which the slot 4 is partitioned into the radially-outer and radially-inner sections 4*a* and 4*b*. As a result, the magnetic flux created by the current Ia and the magnetic flux created by the current Ib are canceled by each other at the connecting portion 6, thereby reliably preventing magnetic saturation of the connecting portion 6 from occurring.

Figure 3A:
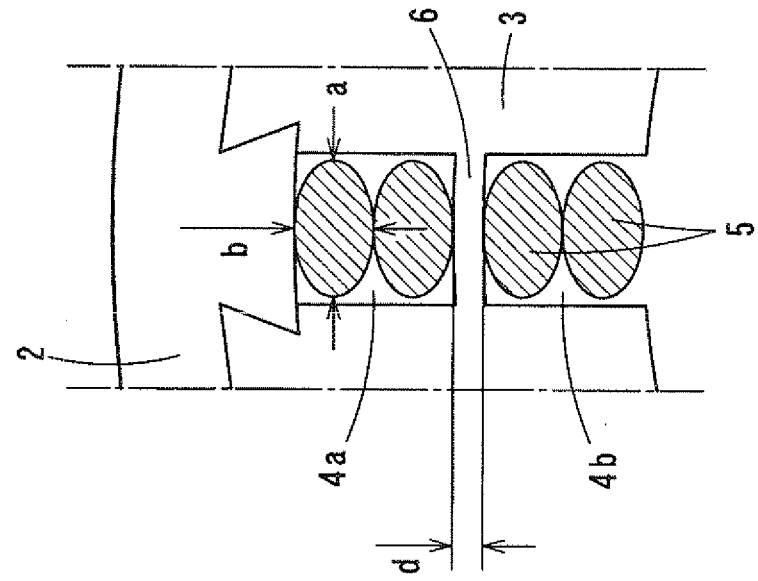
Figure 3B:
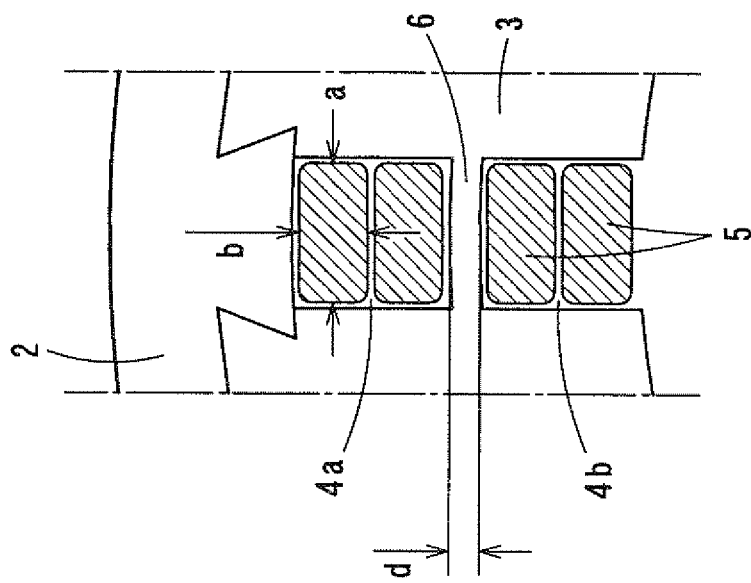

Moreover, the in-slot portions 5 of the stator coil may have a substantially rectangular cross section as shown in FIG. 3A, an elliptical cross section as shown in FIG. 3B, a substantially square cross section as shown in FIG. 4A, or a circular cross section as shown in FIG. 4B. However, in all cases, the following dimensional relationship is satisfied: a≥b, where a is the maximum width of each of the in-slot portions 5 in the width-wise direction of the corresponding slot 4 and b is the maximum thickness of each of the in-slot portions 5 in the radial direction of the stator core 1.

Furthermore, the following dimensional relationship is also satisfied: b>d, where d is the radial thickness of the connecting portions 6. In addition, in the present embodiment, the radial thickness d of the connecting portions 6 is set to be greater than the thickness of the magnetic steel sheets forming the stator tooth ring 30.

After having described the configuration of the stator according to the present embodiment, advantages thereof will be described hereinafter.

In the present embodiment, the stator core 1 includes the annular yoke portion 2, the tooth portions 3 and the slots 4. Each of the tooth portions 3 extends radially inward from the radially inner periphery of the yoke portion 2. The tooth portions 3 are arranged in the circumferential direction of the yoke portion 2 at predetermined intervals. Each of the slots 4 is formed between a circumferentially-adjacent pair of the tooth portions 3. The stator coil is mounted on the stator core 1 so as to have the in-slot portions 5 each of which is received in a corresponding one of the slots 4 of the stator core 1. Further, in the present embodiment, the tooth portions 3 are separately formed from the yoke portion 2. The stator core 1 further includes the connecting portions 6 each of which circumferentially extends to connect a corresponding circumferentially-adjacent pair of the tooth portions 3. The tooth portions 3, which are connected together by the connecting portions 6 and have the stator coil wound therearound, are assembled to the yoke portion 2. Each of the slots 4 is partitioned by a corresponding one of the connecting portions 6 into the radially-outer and radially-inner sections 4*a* and 4*b*.

With the above configuration, for each of the slots 4, when the stator coil is energized so that the direction of the current Ia flowing through the in-slot portions 5 received in the radially-outer section 4*a* is the same as that of the current Ib flowing through the in-slot portions 5 received in the radially-inner section 4*b*, the direction of the magnetic filed H1 created by the current Ia is opposite to that of the magnetic field H2 created by the current Ib at the corresponding connecting portion 6. Consequently, it is possible to reduce the resultant magnetic flux flowing through the corresponding connecting portion 6, thereby preventing the corresponding connecting portion 6 from being magnetically saturated. As a result, it is possible to prevent the distribution of magnetic flux in the motor from being undesirably affected by magnetic saturation of the connecting portions 6 of the stator core 1, thereby suppressing torque ripple of the motor.

Further, in the present embodiment, each of the slots 4 is equally partitioned by the corresponding connecting portion 6 so that the area of a cross section of the radially-outer section 4a perpendicular to the axial direction of the yoke portion 2 is equal to that of the radially-inner section 4b in the axial direction.

With the above configuration, it is possible for the radially-outer and radially-inner sections 4a and 4b to receive the same number of the in-slot portions 5 having the same cross-sectional area. Consequently, when the stator coil is energized so that the direction of current Ia flowing through the in-slot portions 5 received in the radially-outer section 4a is the same as that of current Ib flowing through the in-slot portions 5 received in the radially-inner section 4b, the magnetic flux created by the current Ia and the magnetic flux created by the current Ib can be completely canceled by each other at the corresponding connecting portion 6. Accordingly, the resultant magnetic flux flowing through the corresponding connecting portion 6 can be made zero. As a result, it is possible to reliably prevent magnetic saturation of the corresponding connecting portion 6 from occurring, thereby more effectively suppressing torque ripple of the motor.

In addition, for each of the slots 4, the in-slot portions 5 of the stator coil received in the radially-outer section 4a of the slot 4 can be electrically connected either in series or in parallel with those received in the radially-inner section 4b of the slot 4. Consequently, it is possible to easily control the energization (or electric power supply) of the stator coil.

Figure 6A:
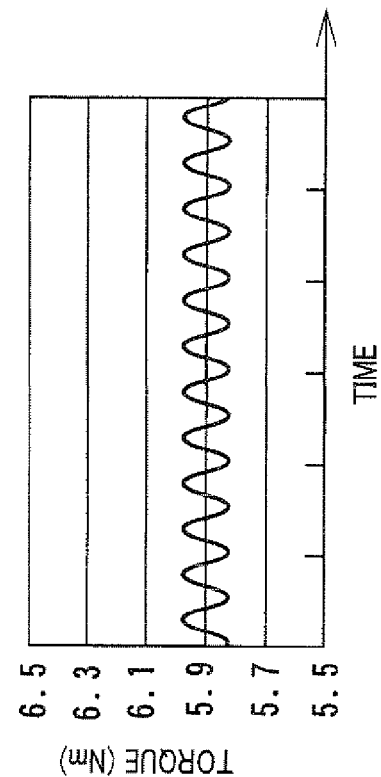
FIG. 6A is a waveform chart illustrating the waveform of torque generated by the motor according to the first embodiment.
Figure 6B:
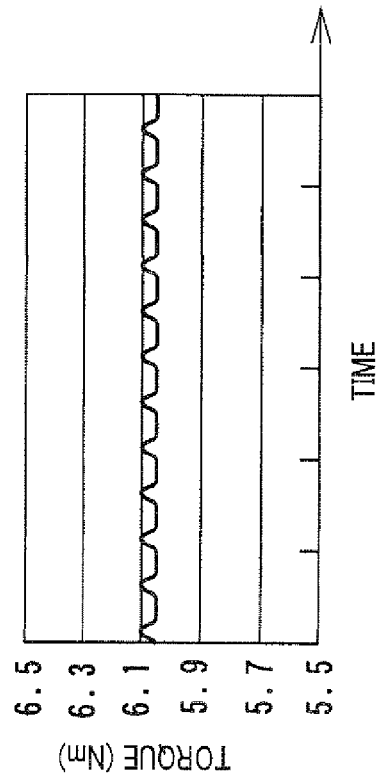
FIG. 6B is a waveform chart illustrating the waveform of torque generated by a conventional motor.
Figure 11:
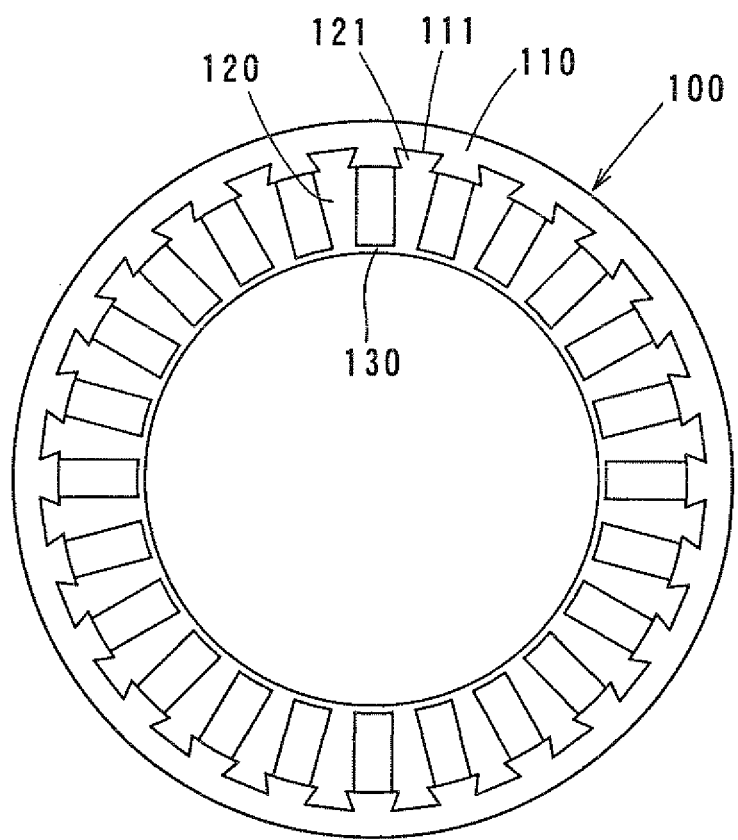
FIG. 11 is an axial end view of a stator core according to the prior art.

FIG. 6A shows the waveform of torque generated by the motor according to the present embodiment. FIG. 6B shows the waveform of torque generated by a conventional motor in which the radially inner ends of the tooth portions of the stator core are connected together by an annular connecting portion (see FIG. 11).

As seen from FIGS. 6A and 6B, the torque ripple of the motor according to the present embodiment is considerably lower than that of the conventional motor. Moreover, the torque generated by the motor according to the present embodiment is considerably higher than that of the conventional motor.

Accordingly, when the motor according to the present embodiment is employed in an electric steering system of a motor vehicle, it is possible to improve the steering feeling for the driver. That is, the motor according to the present embodiment is suitable for use in an electric steering system of a motor vehicle.

In the present embodiment, the yoke portion 2 has the recesses 2a that are formed in the radially inner surface of the yoke portion 2 and spaced at predetermined intervals in the circumferential direction of the yoke portion 2. Each of the tooth portions 3 has the protrusion 3a formed at the radially outer end thereof. The tooth portions 3 are assembled to the yoke portion 2 by fitting the protrusions 3a of the tooth portions 3 respectively into the recesses 2a of the yoke portion 2 in the axial direction of the yoke portion 2.

In the process of assembling the tooth portions 3 to the yoke portion 2, if the tooth portions 3 were not connected together, it would be necessary to separately fit the protrusions 3a into the respective recesses 2a using a special jig for positioning the protrusions 3a with respect to the recesses 2a. However, in the present embodiment, the tooth portions 3 are connected together by the connecting portions 6 to form the stator tooth ring 30. Consequently, it is possible to easily fit the protrusions 3a into the respective recesses 2a at the same time without using a special jig for positioning the protrusions 3a with respect to the recesses 2a.

In the present embodiment, the tooth portions 3 are shaped so that each of the slots 4 formed between the tooth portions 3 has a constant circumferential width in the radial direction of the yoke portion 2. More specifically, for each of the slots 4, those circumferential side surfaces of the tooth portions 3 which define the slot 4 therebetween extend parallel to each other.

With the above configuration, the in-slot portions 5 of the stator coil may have a substantially rectangular cross section as shown in FIG. 3A or a substantially square cross section as shown in FIG. 4A, thereby securing high space factors of the in-slot portions 5 of the stator coil in the slots 4 of the stator core 1.

In the present embodiment, the following dimensional relationship is specified: a≥b>d, where a is the maximum width of each of the in-slot portions 5 of the stator coil in the width-wise direction of the corresponding slot 4, b is the maximum thickness of each of the in-slot portions 5 in the radial direction of the stator core 1, and d is the radial thickness of the connecting portions 6 of the stator core 1.

As described previously, the resultant magnetic flux flowing through each of the connecting portions 6 of the stator core 1 can be made zero. Therefore, the connecting portions 6 are only required to perform the function of connecting the tooth portions 3 together. Accordingly, by specifying the radial thickness d of the connecting portions 6 to be less than b, it is possible to minimize the reduction in volume of the slots 4 due to the presence of the connecting portions 6, thereby maximizing electric loading of the stator.

Further, in the present embodiment, all the tooth portions 3 are connected together by the connecting portions 6 to make up the stator tooth ring 30. The stator tooth ring 30 is formed by laminating the magnetic steel sheets shaped as shown in FIG. 2B in the axial direction of the yoke portion 2. The radial thickness d of the connecting portions 6 is set to be greater than the thickness of the magnetic steel sheets.

By specifying the radial thickness d as above, it is possible to reliably form the stator tooth ring 30 by, for example, pressing without deformation of the connecting portions 6.

Second Embodiment

In the previous embodiment, the circumferential width of each of the tooth portions 3 of the stator core 1 is gradually decreased in the radially inward direction, thereby making the circumferential width of each of the slots 4 formed between the tooth portions 3 constant in the radial direction.

Figure 7:
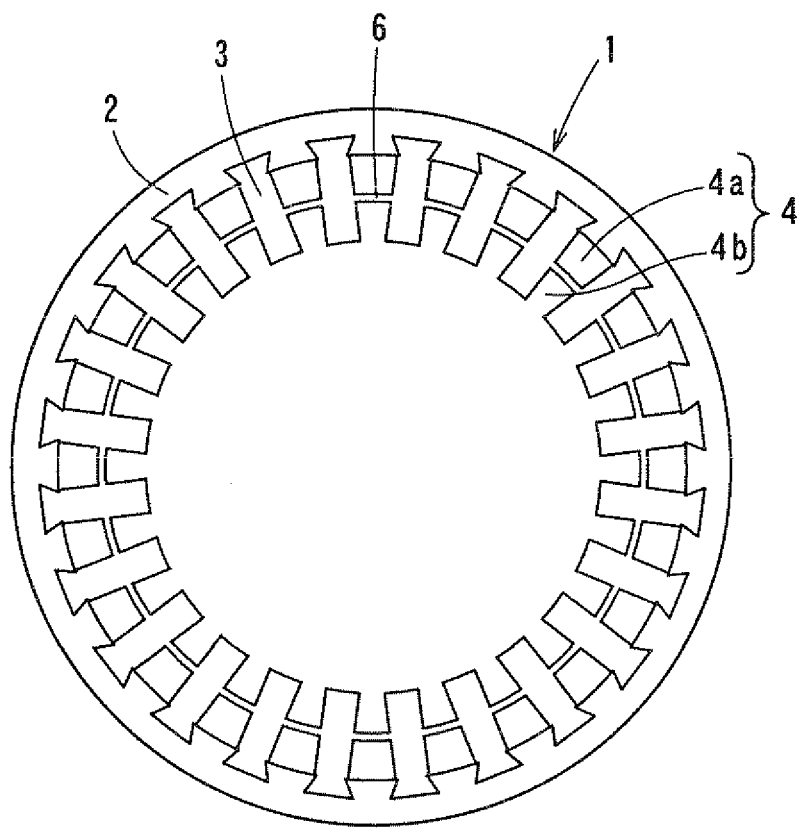
FIG. 7 is an axial end view of a stator core according to the second embodiment of the invention.

In comparison, referring to FIG. 7, in this embodiment, the circumferential width of each of the tooth portions 3 of the stator core 1 is set to be constant in the radial direction. Consequently, the circumferential width of each of the slots 4 formed between the tooth portions 3 is gradually decreased in the radially inward direction.

Setting the circumferential width of each of the tooth portions 3 as above, it is possible to keep the cross-sectional area of a magnetic path formed by the tooth portion 3 constant in the radial direction. As a result, it is possible to prevent each of the tooth portions 3 from being magnetically saturated.

Figure 8:
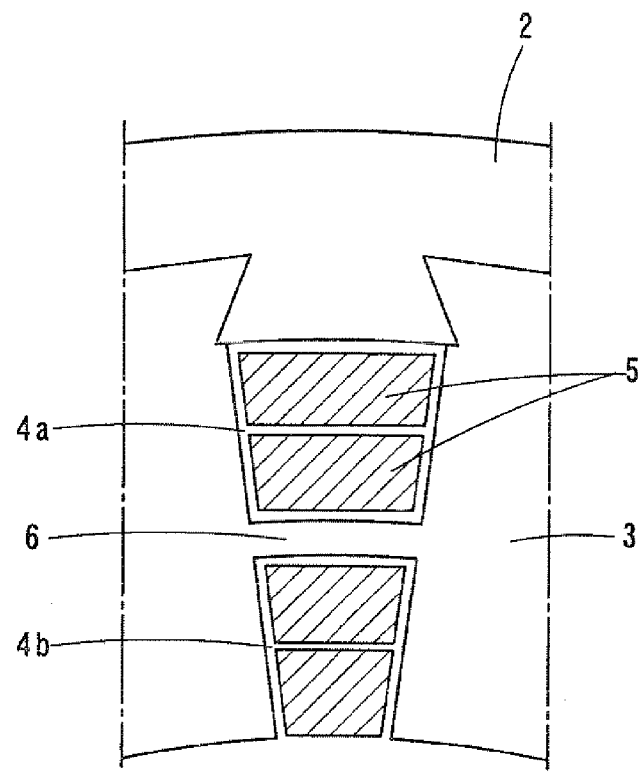
FIG. 8 is a schematic view illustrating the cross-sectional shape of in-slot portions of a stator coil according to the second embodiment.

Moreover, referring to FIG. 8, in this embodiment, the cross-sectional shapes of the in-slot portions 5 of the stator coil are fitted to that of the slots 4 of the stator core 1. More specifically, for each of the slots 4 of the stator core 1, the circumferential widths of the in-slot portions 5 of the stator coil received in both the radially-outer and inner-sections 4a and 4b of the slot 4 are gradually decreased in the radially inward direction. As a result, it is possible to secure high space factors of the in-slot portions 5 of the stator coil in the slots 4 of the stator core 1.

Third Embodiment

In the first embodiment, for each of the recesses 2a of the yoke portion 2 of the stator core 1, the circumferential width of the recess 2a is gradually increased in the radially outward direction. Moreover, the protrusions 3a of the tooth portions 3 are so shaped that each of the protrusions 3a can be fitted into a corresponding one of the recesses 2a of the yoke portion 2 with almost no clearance therebetween. Consequently, when viewed along the axial direction of the yoke portion 2, the recesses 2a of the yoke portion 2 and the protrusions 3a of the tooth portions 3 each have a trapezoidal shape tapering radially inward (see FIGS. 2A-2B).

Figure 9:
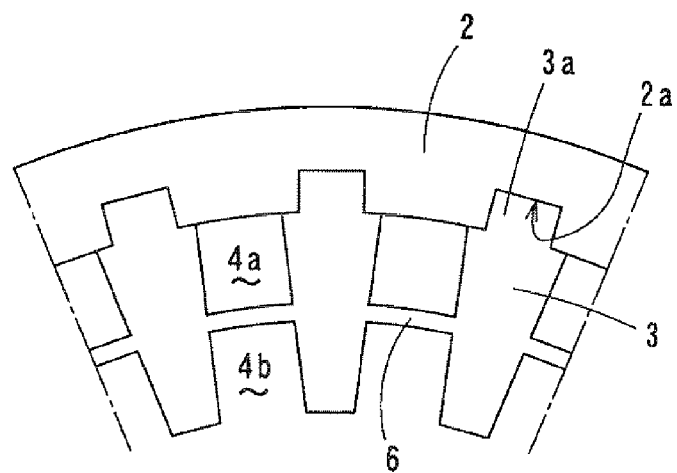
FIG. 9 is an axial end view of part of a stator core according to the third embodiment of the invention.

In comparison, referring to FIG. 9, in this embodiment, for each of the recesses 2a of the yoke portion 2, the circumferential width of the recess 2a is set to be constant in the radial direction. Moreover, the protrusions 3a of the tooth portions 3 are so shaped that each of the protrusions 3a can be fitted into a corresponding one of the recesses 2a of the yoke portion 2 with almost no clearance therebetween. Consequently, when viewed along the axial direction of the yoke portion 2, the recesses 2a of the yoke portion 2 and the protrusions 3a of the tooth portions 3 each have a rectangular shape.

With the above configuration, it is possible to simplify the formation of the recesses 2a in the yoke portion 2 and the protrusions 3a in the tooth portions 3. In addition, by virtue of the connecting portions 6 which connect all the tooth portions 3 together, it is also possible to reliably prevent the tooth portions 3 from being detached from the yoke portion 2 in the radially inward direction.

Fourth Embodiment

In the first embodiment, the tooth portions 3 are assembled to the yoke portion 2 by fitting the protrusions 3a of the tooth portions 3 respectively into the recesses 2a of the yoke portion 2 in the axial direction of the yoke portion 2.

Figure 10:
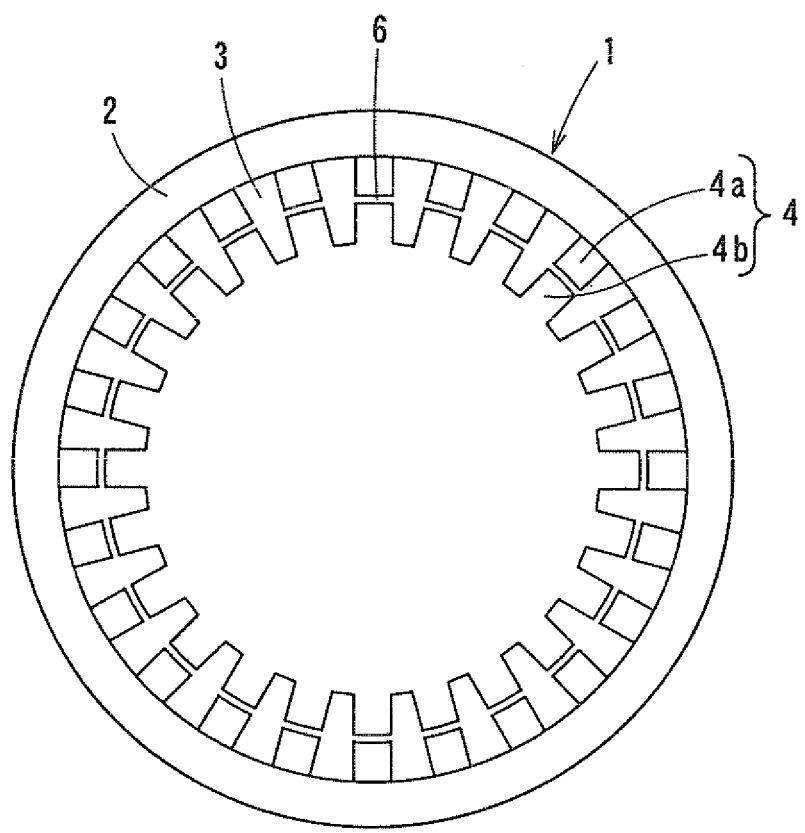
FIG. 10 is an axial end view of a stator core according to the fourth embodiment of the invention.

In comparison, referring to FIG. 10, in this embodiment, the yoke portion 2 has no recesses formed in the radially inner surface thereof; each of the tooth portions 3 has no protrusion formed at the radially outer end thereof. The tooth portions 3 are assembled to the yoke portion 2 by press-fitting the radially outer surfaces of the tooth portions 3 to the radially inner surface of the yoke portion 2.

With the above configuration, it is possible to simplify the shapes of the yoke portion 2 and tooth portions 3. In addition, by virtue of the connecting portions 6 which connect all the tooth portions 3 together, it is also possible to reliably prevent the tooth portions 3 from being detached from the yoke portion 2 in the radially inward direction.

While the above particular embodiments of the present invention have been shown and described, it will be understood by those skilled in the art that various modifications, changes, and improvements may be made without departing from the spirit of the invention.

For example, in the previous embodiments, the present invention is directed to a stator for an AC motor. However, it is also possible to apply the invention to a stator for an AC generator.

What is claimed is:

1. A stator for an electric rotating machine, the stator comprising:
    a stator core that includes an annular yoke portion, a plurality of tooth portions and a plurality of slots, each of the tooth portions extending radially inward from a radially inner periphery of the yoke portion, the tooth portions being arranged in a circumferential direction of the yoke portion at predetermined intervals, each of the slots being formed between a circumferentially-adjacent pair of the tooth portions; and
    a stator coil that is mounted on the stator core so as to have a plurality of in-slot portions each of which is received in a corresponding one of the slots of the stator core,
    wherein
    the tooth portions of the stator core are separately formed from and assembled to the yoke portion,
    the stator core further comprises a plurality of connecting portions each of which circumferentially extends to connect a corresponding circumferentially-adjacent pair of the tooth portions,
    each of the slots of the stator core is partitioned by a corresponding one of the connecting portions into a radially-outer section and a radially-inner section, and
    the stator coil is mounted on the stator core so that:
    in each of the radially-outer and radially-inner sections of the slots, there is received at least one of the in-slot portions of the stator coil,
    for each of the slots, the at least one in-slot portion received in the radially-outer section of the slot creates a first magnetic field while the at least one in-slot portion received in the radially-inner section of the slot creates a second magnetic field, and
    the magnitudes of the first and second magnetic fields are equal to each other, but the directions of the first and second magnetic fields are opposite to each other at the corresponding connecting portion by which the slot is partitioned.

2. The stator as set forth in claim 1, wherein each of the slots is equally partitioned by the corresponding connecting portion so that the area of a cross section of the radially-outer section perpendicular to the axial direction of the yoke portion is equal to that of the radially-inner section perpendicular to the axial direction.

3. The stator as set forth in claim 1, wherein the yoke portion has a plurality of recesses that are formed in a radially inner surface of the yoke portion and spaced at predetermined intervals in the circumferential direction of the yoke portion,
    each of the tooth portions has a protrusion formed at a radially outer end thereof, and
    the tooth portions are assembled to the yoke portion by fitting the protrusions of the tooth portions respectively into the recesses of the yoke portion.

4. The stator as set forth in claim 1, wherein the tooth portions are assembled to the yoke portion by press-fitting radially outer surfaces of the tooth portions to a radially inner surface of the yoke portion.

5. The stator as set forth in claim 1, wherein the tooth portions are shaped so that each of the slots formed between the tooth portions has a constant circumferential width in a radial direction of the yoke portion.

6. The stator as set forth in claim 1, wherein the tooth portions are so shaped as to have a constant circumferential width in a radial direction of the yoke portion.

7. The stator as set forth in claim 1, wherein the following dimensional relationship is satisfied: a≥b>d, where a is the maximum width of each of the in-slot portions of the stator coil in a width-wise direction of the corresponding slot, b is the maximum thickness of each of the in-slot portions of the stator coil in a radial direction of the stator core, and d is the radial thickness of the connecting portions of the stator core.

8. The stator as set forth in claim 1, wherein all of the tooth portions and connecting portions of the stator core together make up a stator tooth ring, the stator tooth ring is formed of a plurality of magnetic steel sheets that are laminated in the axial direction of the yoke portion, the radial thickness of the connecting portions is set to be greater than the thickness of the magnetic steel sheets.

\* \* \* \* \*